(12) United States Patent
Bloch et al.

(10) Patent No.: US 10,454,991 B2
(45) Date of Patent: Oct. 22, 2019

(54) NIC WITH SWITCHING FUNCTIONALITY BETWEEN NETWORK PORTS

(71) Applicant: Mellanox Technologies Ltd., Yokneam (IL)

(72) Inventors: Noam Bloch, Bat Shlomo (IL); Ariel Shachar, Jerusalem (IL); Michael Kagan, Zichron Yaakov (IL); Lior Narkis, Petach Tikva (IL); Shlomo Raikin, Moshav Ofer (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 476 days.

(21) Appl. No.: 14/658,260

(22) Filed: Mar. 16, 2015

(65) Prior Publication Data
US 2015/0271244 A1    Sep. 24, 2015

Related U.S. Application Data (60) Provisional application No. 61/969,359, filed on Mar. 24, 2014.

(51) Int. Cl.
*H04L 29/08*        (2006.01)
*G06F 9/455*        (2018.01)

(52) U.S. Cl.
CPC .......... *H04L 67/02* (2013.01); *G06F 9/45558* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 4,751,648 A | * | 6/1988 | Sears, III | ................ E21B 47/12 340/3.21 |
| 5,901,291 A | * | 5/1999 | Feeney | ................ G06F 13/128 370/409 |
| 5,961,659 A | * | 10/1999 | Benner | ................ H04L 1/1887 710/52 |
| 6,148,082 A | | 11/2000 | Slattery et al. | |
| 6,335,930 B1 | | 1/2002 | Lee | |
| 6,532,211 B1 | | 3/2003 | Rathonyi et al. | |
| 6,775,268 B1 | | 8/2004 | Wang et al. | |
| 6,804,532 B1 | | 10/2004 | Moon et al. | |
| 7,159,111 B1 | | 1/2007 | Ganapathy | |

(Continued)

OTHER PUBLICATIONS

U.S. Appl. No. 13/291,143 Office Action dated Oct. 15, 2015.

(Continued)

*Primary Examiner* — Aaron N Strange
*Assistant Examiner* — Mohammad Yousuf A. Mian
(74) *Attorney, Agent, or Firm* — Kligler & Associates (57) ABSTRACT

A network interface device includes a host interface for connection to a host processor and a network interface, which is configured to transmit and receive data packets over a network, and which comprises multiple distinct physical ports configured for connection to the network. Processing circuitry is configured to receive, via one of the physical ports, a data packet from the network and to decide, responsively to a destination identifier in the packet, whether to deliver a payload of the data packet to the host processor via the host interface or to forward the data packet to the network via another one of the physical ports.

17 Claims, 4 Drawing Sheets

(56) References Cited

U.S. PATENT DOCUMENTS

| | | | |
|---|---|---|---|
| 7,286,535 | B2 | 10/2007 | Ishikawa et al. |
| 7,539,772 | B2 | 5/2009 | Herring et al. |
| 7,675,876 | B2 | 3/2010 | Foster et al. |
| 7,746,854 | B2 | 6/2010 | Ambe et al. |
| 7,937,499 | B1 | 5/2011 | Tripathi |
| 8,051,212 | B2 | 11/2011 | Kagan et al. |
| 8,341,724 | B1 | 12/2012 | Burns et al. |
| 8,804,747 | B2 | 8/2014 | Galles et al. |
| 9,014,006 | B2 | 4/2015 | Haramaty et al. |
| 9,390,056 | B1* | 7/2016 | Noureddine |
| 2003/0041161 | A1* | 2/2003 | Billings ............... H04L 12/44 709/231 |
| 2003/0065812 | A1 | 4/2003 | Beier et al. |
| 2003/0065856 | A1 | 4/2003 | Kagan et al. |
| 2004/0267881 | A1 | 12/2004 | Yao et al. |
| 2005/0071473 | A1 | 3/2005 | Rosenstock et al. |
| 2005/0108518 | A1 | 5/2005 | Pandya |
| 2006/0227788 | A1 | 10/2006 | Eldar et al. |
| 2006/0280181 | A1 | 12/2006 | Brailas et al. |
| 2007/0005742 | A1 | 1/2007 | Eldar et al. |
| 2007/0058536 | A1 | 3/2007 | Vaananen et al. |
| 2007/0110081 | A1* | 5/2007 | Miller ................. H04L 12/10 370/401 |
| 2007/0211741 | A1 | 9/2007 | Kagan et al. |
| 2008/0013549 | A1 | 1/2008 | Okagawa et al. |
| 2008/0022148 | A1* | 1/2008 | Barnea ............... G06F 9/4411 714/5.1 |
| 2008/0080505 | A1 | 4/2008 | Munoz |
| 2008/0112415 | A1 | 5/2008 | Sobaje |
| 2008/0189432 | A1 | 8/2008 | Abali et al. |
| 2008/0205403 | A1 | 8/2008 | Akyol et al. |
| 2009/0077567 | A1 | 3/2009 | Craddock |
| 2009/0119565 | A1 | 5/2009 | Park et al. |
| 2009/0141734 | A1 | 6/2009 | Brown et al. |
| 2009/0238181 | A1 | 9/2009 | Desai et al. |
| 2010/0039959 | A1 | 2/2010 | Gilmartin |
| 2010/0118875 | A1 | 5/2010 | Lebizay et al. |
| 2010/0220732 | A1 | 9/2010 | Hussain et al. |
| 2010/0232443 | A1* | 9/2010 | Pandey ................. H04L 49/70 370/401 |
| 2010/0284404 | A1 | 11/2010 | Gopinath et al. |
| 2010/0290475 | A1 | 11/2010 | Belanger et al. |
| 2010/0315958 | A1 | 12/2010 | Luo et al. |
| 2011/0064084 | A1 | 3/2011 | Tatar et al. |
| 2011/0096668 | A1 | 4/2011 | Bloch et al. |
| 2011/0134753 | A1 | 6/2011 | Kashyap |
| 2012/0300669 | A1 | 11/2012 | Zahavi |
| 2012/0314706 | A1 | 12/2012 | Liss |
| 2013/0114599 | A1 | 5/2013 | Arad et al. |
| 2013/0151744 | A1 | 6/2013 | Gupta et al. |
| 2013/0315237 | A1 | 11/2013 | Kagan et al. |
| 2014/0185616 | A1 | 7/2014 | Bloch et al. |
| 2014/0254594 | A1* | 9/2014 | Gasparakis ........... H04L 45/74 370/392 |

OTHER PUBLICATIONS

U.S. Appl. No. 13/291,143 Office Action dated Mar. 21, 2016.

Leiserson, C E., "Fat-Trees: Universal Networks for Hardware Efficient Supercomputing", IEEE Transactions on Computers, vol. C-34, No. 10, pp. 892-901, Oct. 1985.

Ohring et al., "On Generalized Fat Trees", Proceedings of the 9th International Symposium on Parallel Processing, pp. 37-44, Santa Barbara, USA, Apr. 25-28, 1995.

Zahavi, E., "D-Mod-K Routing Providing Non-Blocking Traffic for Shift Permutations on Real Life Fat Trees", CCIT Technical Report #776, Technion—Israel Institute of Technology, Haifa, Israel, Aug. 2010.

Yuan et al., "Oblivious Routing for Fat-Tree Based System Area Networks with Uncertain Traffic Demands", Proceedings of ACM SIGMETRICS—The International Conference on Measurement and Modeling of Computer Systems, pp. 337-348, San Diego, USA, Jun. 12-16, 2007.

Matsuoka S., "You Don't Really Need Big Fat Switches Anymore— Almost", IPSJ SIG Technical Reports, vol. 2003, No. 83, pp. 157-162, year 2003.

Kim et al., "Technology-Driven, Highly-Scalable Dragonfly Topology", 35th International Symposium on Computer Architecture, pp. 77-78, Beijing, China, Jun. 21-25, 2008.

Jiang et al., "Indirect Adaptive Routing on Large Scale Interconnection Networks", 36th International Symposium on Computer Architecture, pp. 220-231, Austin, USA, Jun. 20-24, 2009.

Minkenberg et al., "Adaptive Routing in Data Center Bridges", Proceedings of 17th IEEE Symposium on High Performance Interconnects, New York, USA, pp. 33-41, Aug. 25-27, 2009.

Kim et al., "Adaptive Routing in High-Radix Clos Network", Proceedings of the 2006 ACM/IEEE Conference on Supercomputing (SC2006), Tampa, USA, Nov. 2006.

Infiniband Trade Association, "InfiniBandTM Architecture Specification vol. 1", Release 1.2.1, Nov. 2007.

Culley et al., "Marker PDU Aligned Framing for TCP Specification", IETF Network Working Group, RFC 5044, Oct. 2007.

Shah et al., "Direct Data Placement over Reliable Transports", IETF Network Working Group, RFC 5041, Oct. 2007.

U.S. Appl. No. 13/291,143 Office Action dated Jun. 27, 2014.

Martinez et al., "Supporting fully adaptive routing in Infiniband networks", Proceedings of the International Parallel and Distributed Processing Symposium (IPDPS'03), Nice, France, 10 pages, Apr. 22-26, 2003.

Joseph, S., "Adaptive routing in distributed decentralized systems: NeuroGrid, Gnutella & Freenet", Proceedings of Workshop on Infrastructure for Agents, MAS and Scalable MAS, Montreal, Canada, 11 pages, year 2001.

Ding et al., "Level-wise scheduling algorithm for fat tree interconnection networks", Proceedings of the 2006 ACM/IEEE Conference on Supercomputing (SC 2006), 9 pages, Nov. 2006.

U.S. Appl. No. 13/291,143 Office Action dated May 7, 2015.

Gusat et al., "R3C2: Reactive Route & Rate Control for CEE", Proceedings of 18th IEEE Symposium on High Performance Interconnects, New York, USA, pp. 50-57, Aug. 10-27, 2010.

Wu et al., "DARD: Distributed adaptive routing datacenter networks", Proceedings of IEEE 32nd International Conference Distributed Computing Systems, pp. 32-41, Jun. 18-21, 2012.

U.S. Appl. No. 15/145,848 Office Action dated Oct. 3, 2017.

\* cited by examiner

NIC WITH SWITCHING FUNCTIONALITY BETWEEN NETWORK PORTS

CROSS-REFERENCE TO RELATED APPLICATIONS

This application claims the benefit of U.S. Provisional Patent Application 61/969,359, filed Mar. 24, 2014, which is incorporated herein by reference.

FIELD OF THE INVENTION

The present invention relates generally to computer networks, and particularly to devices and methods for interfacing between host computers and a network.

BACKGROUND

A network interface controller (NIC) is a device that manages and transfers communications between a host computer (referred to alternatively simply as a "host") and a network, such as a local area network or switch fabric. The NIC directs packets from the network to their destination in the computer, for example by placing the packets in a buffer of a destination application in the computer memory, and directs outgoing packets, for example sending them either to the network or to a loopback port.

When a host computer supports multiple virtual machines (VMs), different approaches may be taken by the NIC in handling incoming and outgoing packets. In one approach, all packets are directed to a virtual machine monitor (VMM, also known as a hypervisor) running on the host, and the VMM directs the packets to the specific destination virtual machine. More recently, however, NICs have been developed with the capability of exposing multiple virtual NICs (vNICs) to software running on the host. In a model that is known as single-root I/O virtualization (SR-IOV), each VM interacts with its own corresponding vNIC, which appears to the VM to be a dedicated hardware NIC. The vNIC links the VM to other machines (virtual and/or physical) on a network, possibly including other virtual machines running on the same host. In this regard, the NIC acts as a virtual switch, connecting each of the virtual machines to a network while allowing multiple vNICs to share the same physical network port.

A variety of NICs that support the SR-IOV model are known in the art. For example, U.S. Patent Application Publication 2014/0185616, which is assigned to the assignee of the present patent application and whose disclosure is incorporated herein by reference, describes a NIC that supports multiple virtualized (tenant) networks overlaid on a data network. Upon receiving a work item submitted by a virtual machine running on a host processor, the NIC identifies the tenant network over which the virtual machine is authorized to communicate, generates a data packet containing an encapsulation header that is associated with the tenant network, and transmits the data packet over the network.

SUMMARY

Embodiments of the present invention that are described hereinbelow provide network interface devices and methods for steering and switching packets between a host computer and a network.

There is therefore provided, in accordance with an embodiment of the invention, a network interface device, which includes a host interface for connection to a host processor and a network interface, which is configured to transmit and receive data packets over a network, and which includes multiple distinct physical ports configured for connection to the network. Processing circuitry is configured to receive, via one of the physical ports, a data packet from the network and to decide, responsively to a destination identifier in the packet, whether to deliver a payload of the data packet to the host processor via the host interface or to forward the data packet to the network via another one of the physical ports.

In some embodiments, the host processor is configured to run multiple virtual machines, and the processing circuitry is configured to receive, via the host interface, a request from one of the virtual machines running on the host processor to transmit data in a further data packet, and responsively to the request, to decide whether to deliver the data to another one of the virtual machines running on the host processor or to forward the further data packet to the network via the network interface. Typically, the processing circuitry is configured to forward the further data packet to the network from any of the virtual machines running on the host processor via any of the physical ports.

Additionally or alternatively, the host interface is configured for connection to multiple host processors, and the processing circuitry is configured to receive, via the host interface, a request from one of the host processors to transmit data in a further data packet, and responsively to the request, to decide whether to deliver the data to another one of the host processors or to forward the further data packet to the network via the network interface. The processing circuitry is configured to forward the further data packet to the network from any of the host processors via any of the physical ports.

In some embodiments, the processing circuitry includes a receive pipe, coupled to receive the data packets from the network and to scatter the payload via the host interface to a system memory of the host computer, and a send pipe, coupled to transmit the data packets to the network. Steering logic is configured, upon deciding that the data packet is to be forwarded to the network, to queue the data packet for transmission in the send pipe. In a disclosed embodiment, the steering logic is configured, upon deciding that the data packet is to be forwarded to the network, to place a work item in a send queue without informing the host processor that the data packet has arrived, wherein the work item, when executed by the send pipe, causes the send pipe to fetch the data packet and to select a physical port through which to transmit the data packet to the network. Typically, the processing circuitry is configured to place the payload in of the data packet in a buffer, from which the send pipe fetches the payload for transmission.

In a disclosed embodiment, the processing circuitry is configured to decide whether to deliver the payload of the data packet to the host processor to forward the data packet to the network by comparing the destination identifier of the data packet to entries in a forwarding database.

In some embodiments, the processing circuitry is configured to apply at least one ancillary function to the data packets, selected from a group of ancillary functions consisting of controlling a quality of service of the data packets transmitted to the network; encapsulating and decapsulating packets that are transmitted via virtualized networks overlaid on the network; congestion control; metering and counting the data packets; rewriting headers of the data packets; and enforcement of access control lists.

There is also provided, in accordance with an embodiment of the invention, a computing system, which includes multiple host computers, including at least first and second host computers. Each host computer includes a host processor and a network interface controller (NIC), which is coupled to the host processor and is configured to transmit and receive data packets between the host processor and a network. The NIC includes multiple distinct physical ports configured for connection to the network, including at least first and second physical ports, and processing circuitry, which is configured to receive, via one of the physical ports, a data packet from the network and to decide, responsively to a destination identifier in the packet, whether to deliver a payload of the data packet to the host processor via the host interface or to forward the data packet to the network via another one of the physical port. A physical link connects the second physical port of the first host computer to the first physical port of the second computer.

In some embodiments, the multiple host computers further include at least a third host computer, wherein at least the first, second and third host computers are connected together in a chain, including respective physical links connecting the second physical port of each of the host computers in the chain to the first physical port of the next host computer in the chain, while the first physical port of the first host computer and the second physical port of a final host computer in the chain are connected to the network.

In a disclosed embodiment, the system includes a network switch, configured for connection to other switches in the network, and first and second network cables, which respectively connect the first physical port of the first host computer and the second physical port of the final host computer in the chain to respective ports of the network switch. The multiple host computers and the network switch may be mounted together in a rack, wherein the physical links include interconnect cables, which are substantially shorter than at least one of the first and second network cables.

There is additionally provided, a method for communication, which includes configuring a network interface controller (NIC), which is coupled to a host processor, to transmit and receive data packets over a data network via multiple distinct physical ports of the NIC that are configured for connection to the network. Upon receiving, via one of the physical ports, a data packet from the network, the NIC decides, responsively to a destination identifier in the packet, whether to deliver a payload of the data packet to the host processor via the host interface or to forward the data packet to the network via another one of the physical ports.

There is further provided, in accordance with an embodiment of the invention, a computing method, which includes providing multiple host computers, including at least first and second host computers. Each host computer includes a host processor and a network interface controller (NIC), which is coupled to the host processor and is configured to transmit and receive data packets between the host processor and a network. The NIC includes multiple distinct physical ports configured for connection to the network, including at least first and second physical ports, and processing circuitry, as described above. The second physical port of the first host computer is connected to the first physical port of the second computer by a physical link.

The present invention will be more fully understood from the following detailed description of the embodiments thereof, taken together with the drawings in which:

DETAILED DESCRIPTION OF EMBODIMENTS

Overview

Many NICs have two (or possibly more) network ports and are capable of both sending and receiving packets through both ports. In a conventional NIC, packets received through a given port are passed to a receive pipe in the NIC, which scatters the data in the packet payload to the system memory. In a typical scenario, client processes running on the host, such as application programs, post descriptors (also referred to as work items or work queue elements—"WQEs") to receive queues of the NIC, indicating the locations of buffers in the system memory to which the data are to be written. The receive pipe logic reads the appropriate descriptors, scatters the data accordingly, and then places a completion entry (also referred to as a completion queue element, or "CQE") in a completion queue (CQ) in the system memory to report to the client process that the data have been received.

To send a packet, the client process posts a write request descriptor to an appropriate send queue of the NIC, indicating the location in the system memory of data to be transmitted, and sends a notification (referred to as "ringing a doorbell") to the NIC that a request is awaiting service. Send pipe logic in the NIC reads the descriptor, and then transmits the data to the appropriate address on the network in one or more packets, through the appropriate one of the NIC ports.

In a NIC with SR-IOV support, as explained above, each vNIC is linked to one of the physical network ports via a switching function of the NIC, referred to as a virtual switch or "eSwitch." Each of the network ports is linked to a corresponding eSwitch. When a vNIC receives a write request from its respective VM running on the host, the eSwitch checks whether to transmit a packet through the corresponding network port or to pass the data from the sending vNIC to another, receiving vNIC that is linked to the same eSwitch.

Embodiments of the present invention that are described hereinbelow enhance this basic virtual switching capability of the NIC to extend to switching between the physical network ports of the NIC. In other words, these embodiments add a link between the two (or more) eSwitches that are exposed by the NIC. As a result, packets received from the network via one of the physical ports of the NIC can be looped back, via the receive and send pipes of the NIC, to the network via another of the ports. By the same token, any of the vNICs exposed by the NIC can access the network through any of the physical ports, and not only the port to which their own corresponding eSwitch is linked. These virtual links and switching capabilities are implemented without the need for actual switching hardware between the physical ports of the NIC.

Thus, in the disclosed embodiments, a network interface device comprises a host interface, for connection to a host processor, and a network interface, which transmits and receive data packets over a network, and which comprises multiple distinct physical ports configured for connection to the network. Upon receiving, via one of the physical ports, a data packet from the network, processing circuitry in the NIC checks a destination identifier in the packet. This destination identifier may comprise, for example, the destination link-layer or network-layer address (such as a MAC or IP address), which may be a physical or virtualized address. Additionally or alternatively, the destination identifier may comprise transport-layer information, such as a TCP tuple or queue pair (QP) number. Based on the destination identifier, the processing circuitry decides whether to deliver the payload of the data packet to the host processor via the host interface or to forward the data packet to the network via another one of the physical ports. Typically, the processing circuitry makes its decision by comparing the destination identifier of the data packet to entries in a forwarding database maintained by the NIC.

By the same token, when the NIC receives, via the host interface, a request from one of the virtual machines running on the host processor to transmit data in a data packet, the processing circuitry decides whether to deliver the data to another one of the virtual machines running on the host processor or to forward the further data packet to the network via the network interface. Data packets from any of the virtual machines running on the host processor may be forwarded via any of the physical ports. In some embodiments, the host interface of the NIC is connected to multiple host processors, and the processing circuitry is capable of delivering data transmitted by one of the host processors to any other one of the host processors or to forward the data to the network via any of the physical ports.

The link between the eSwitches in the NIC enables host computers to be chained together in novel ways, which reduce demands on cabling and other network resources. In some embodiments, two or more host computers, each with a NIC as described above, may be chained by connecting one physical port of the NIC of each host computer to one of the physical ports of the NIC of the next host computer in the chain. Only one physical port of the NIC of the first host computer in the chain and one physical port of the NIC of the final host computer in the chain are connected directly to the network. Packets transmitted from any of the host computers in the chain to the network pass from NIC to NIC until they reach either the NIC of the first host computer or that of the final host computer, from which they reach the network through the corresponding physical port. Incoming packets from the network are transmitted in similar fashion from NIC to NIC until they reach the destination host.

This sort of chaining is useful, for example, when multiple computers are to be mounted together in a rack, with connection to a network via a top-of-rack switch. In this case, the switch requires only a single pair of ports and cables for connecting to all of the computers in the rack, rather than a separate pair of ports and cables for each computer. The number of cables required to connect n computers in the rack is thus n+1, rather than 2n cables as are used in conventional installations. Relatively long network cables are needed only for connecting the first and last (for example, top and bottom) computers in the rack to the switch, while substantially shorter interconnect cables can be used to connect the computers in the rack one to another. (The interconnect cables are "substantially shorter" in the sense that the longer of the network cables is typically at least twice as long as the interconnect cables.) As another example, a similar sort of chaining approach may be implemented using suitable backplane connections in a chassis holding multiple blade servers with NICs as describe above.

System Description

Figure 1:
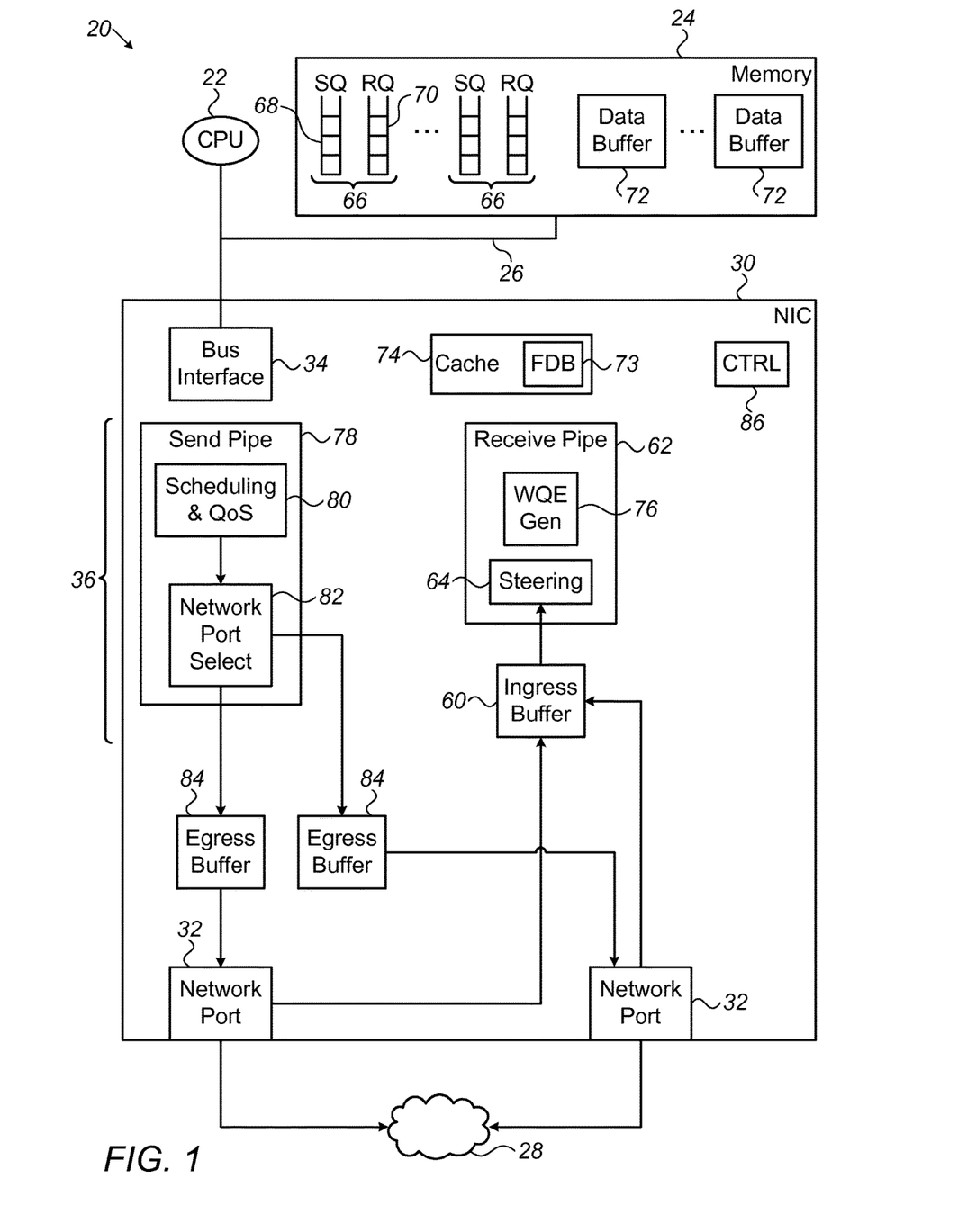
FIG. 1 is a block diagram that schematically illustrates a computer with a NIC, in accordance with an embodiment of the present invention.
Figure 2:
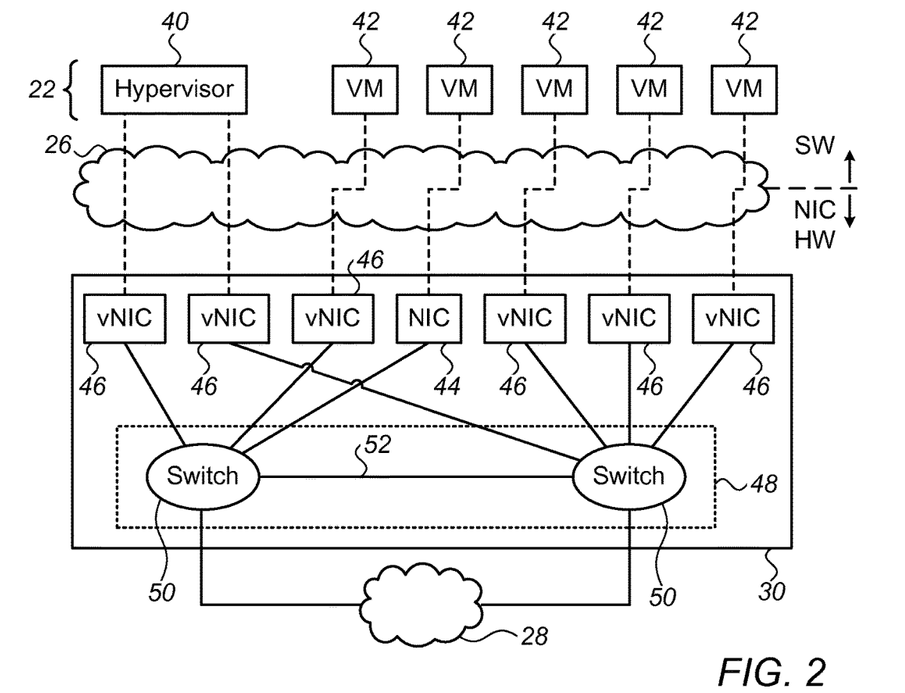
FIG. 2 is a block diagram that schematically shows logical components of a computer with a NIC, in accordance with an embodiment of the present invention.

Reference is now made to FIGS. 1 and 2, which schematically illustrate a computer 20 with a NIC 30, in accordance with an embodiment of the present invention. FIG. 1 shows physical components of the computer (and particularly of the NIC), while FIG. 2 shows logical entities that are supported by these physical components. For the sake of clarity, the physical components of NIC 30 are shown in FIG. 1 as multiple, separate functional blocks. In practice, however, these components are typically (although not necessarily) implemented as hardware and firmware components within a single integrated circuit chip or chipset, possibly together with a central processing unit (CPU) 22 of the computer, as well.

As shown in FIG. 1, computer 20 comprises a host processor, comprising at least one CPU 22 (which may comprise multiple processing cores), and a system memory 24, typically comprising random-access memory (RAM). NIC 30 connects computer 20 to a network 28, such as an Ethernet or InfiniBand switch fabric. NIC 30 comprises a network interface in the form of two (or more) physical network ports 32, configured for connection to network 28. NIC 30 is connected to CPU 22 and memory 24 via a peripheral component bus 26, such as a PCI Express bus, through a bus interface 34, which serves as the host interface of the NIC. Processing circuitry 36 in NIC 30 is connected between network ports 32 and bus interface 34 and handles both incoming packets received from network 28 and outgoing packets for transmission to network 28, as described in greater detail hereinbelow.

As shown in FIG. 2, CPU 22 in this example runs software (indicated by the legend "SW" at the right side of the figure) that includes a hypervisor 40 and multiple virtual machines (VMs) 42, as are known in the art. Processing circuitry 36 exposes a physical NIC function 44 and multiple vNICs 46 to the software on CPU 22. Thus, each VM 42 interacts with a corresponding vNIC 46 (or possibly with NIC function 44). Processing circuitry 36 also implements a virtual switching function 48, which includes two virtual switches 50, referred to eSwitches in SR-IOC parlance, each associated with a respective physical network port 32. Switches 50 each transfer packets between a group of vNICs 46 and the corresponding port 32 and among the vNICs connected to the switch. In addition, processing circuitry 36 provides a virtual link 52 for transfer of patches between switches 50. The implementation and uses of virtual switching function 48, and link 52 in particular, are described in greater detail hereinbelow.

Returning now to FIG. 1, client processes running on CPU 22, such as virtual machines 42 and applications running on the virtual machines, communicate with the transport layer of network 28 by manipulating a transport service instance, known as a "queue pair" (QP) 66, which is made up of a send queue (SQ) 68 and a receive queue (RQ) 70. To send and receive messages over the network using NIC 30, a client process submits descriptors, known as work items or work queue elements (WQEs), to queues 68 and 70 of the appropriate QP 66 for execution by the NIC. Queues 68 and 70 are typically held in memory 24. NIC 30 reads and executes the WQEs from queues 68 and 70 and accordingly gathers data from data buffers 72 in specified locations in memory 24 and transmits the data in outgoing packets over network 28, as well as writing data from incoming packets to the memory.

Ports 32 pass packets that they receive from network 28 to an ingress buffer 60, for processing in a receive pipe 62. Steering logic 64 associated with the receive pipe decides, for each incoming packet, whether to deliver the payload of the packet to CPU 22 via bus interface 34 and memory 24, or to forward the packet back to network 28 via the other port 32. In order to make this decision, steering logic 64 extracts a destination identifier from the packet, typically based on one or more packet header fields, such as the link-layer and/or network-layer address (physical or virtualized), and/or a transport-layer value. Steering logic 64 looks up the destination identifier in a forwarding database (FDB) 73, which may be held at least in part in a cache 74 in NIC 30, and/or held in system memory 24. The entries in FDB 73 indicate, for each destination identifier, whether the packet is to be delivered to a process running on CPU 22, and if so, which VM 42 and which QP 66 are to receive the data; or else that the packet is to be forwarded back to network 28. A learning function running either on CPU 22 or on a suitable processor in NIC 30 (such as a programmable controller 86) may operate to populate FDB 73 with forwarding instructions for new destination identifiers as they are received in NIC 30.

Packet transmission requests by processes running on CPU 22 are processed by a send pipe 78 in NIC 30. As explained earlier, to send data over network 28, client processes place appropriate WQEs in respective send queues 68 and then "ring the doorbell" of send pipe 78 via bus interface 34 to request service. Scheduling and quality of service (QoS) logic 80 associated with send pipe 78 arbitrates among the client requests. (Steering logic 64 and scheduling and QoS logic 80 implement the logical functionality of switches 50, as shown in FIG. 2.) To service a given WQE, send pipe 78 constructs the appropriate header for an outgoing packet or packets, reads the data indicated by the WQE from buffer 72, and places the data in the packet payload. Port selection logic 82 chooses the network port 32 through which the packets are to be transmitted and passes the packets to corresponding egress buffers 84. When hosts are chained together via NICs 30, the choice of port 32 determines whether the packets will be transmitted directly to a switch in the network or passed along to the next host in the chain.

When steering logic 64 in receive pipe 62 decides that that a given packet is to be forwarded back to network 28, it instructs WQE generation logic 76 to place a corresponding WQE in a send queue 68, typically without informing CPU 22 that the data packet has arrived. Typically, in other words, no CQE is generated in this case. Receive pipe 62 places the payload of the data packet in a buffer, from which send pipe 78 fetches the payload for transmission when servicing the WQE. The send queue used by WQE generation logic 76 and the buffer that holds the packet may be held either on NIC 30 (for example, in cache 74) or in system memory 24. Executing this WQE causes send pipe 78 to fetch the packet data and transmit an outgoing data packet through the appropriate port 32 using the same logic and procedures as it uses for send requests generated by client processes running on CPU 22. This mode of interaction between receive pipe 62 and send pipe 78 implements virtual switching function 48 as illustrated in FIG. 2, including virtual link 52 between ports 32. It is described in further detail hereinbelow with reference to FIG. 3.

Methods of Operation

Figure 3:
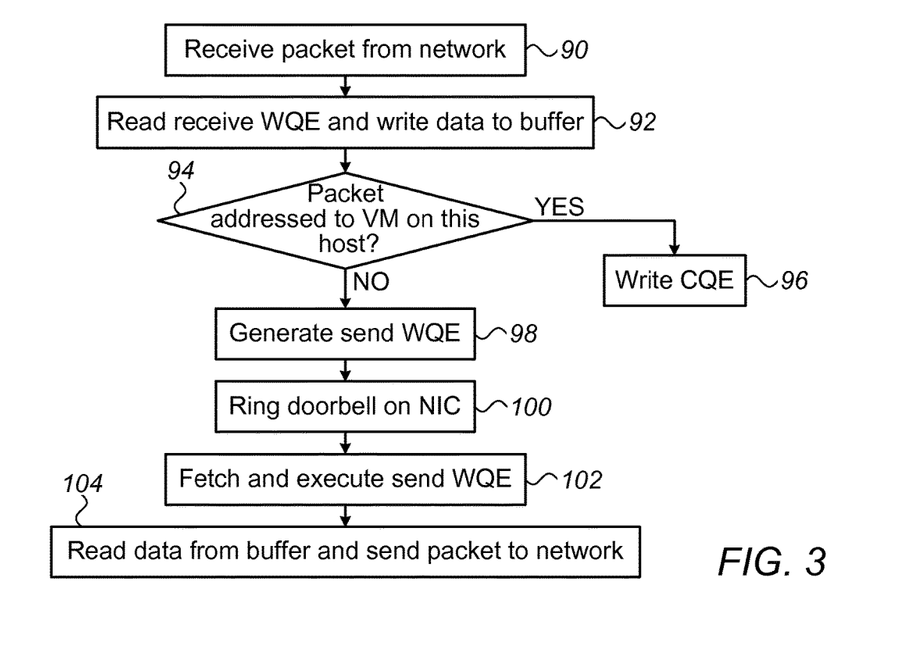
FIG. 3 is a flow chart that schematically illustrates a method for processing packets received from a network, in accordance with an embodiment of the present invention.

FIG. 3 is a flow chart that schematically illustrates a method for processing packets received from network 28 in NIC 30, in accordance with an embodiment of the present invention. For the sake of clarity and concreteness, the method is described specifically with reference to the hardware logic design of NIC 30 that is shown in FIG. 1. The principles of this method, however, may similarly be implemented in NICs of other sorts having suitable hardware and/or software processing resources.

The method of FIG. 3 is initiated when NIC 30 receives an incoming packet via one of network ports 32, at a packet reception step 90. Depending on how the particular port 32 is connected, the packet may come in via a link either to network 28 or to another host to which NIC 30 is chained. The packet is temporarily stored in ingress buffer 60 for handling by receive pipe 62. The receive pipe (among other functions) chooses the receive queue 70 with which the packet should be associated, based on the appropriate packet header fields. The receive pipe then reads a receive WQE from the receive queue and scatters the packet data to the appropriate buffer as indicated by the WQE, at a buffering step 92. The buffer may be either in memory 24 or, particularly for packets that are to be looped back out to the network, in cache 74.

Steering logic 64 checks the destination identifier of the packet in FDB 73 in order to determine whether the packet is directed to a client process (such as a process running on one of VMs 42) on host computer 20, at a destination checking step 94. If so, after writing the packet data to the buffer 72 in memory 24 that is indicated by the receive WQE, receive pipe 62 writes a completion entry (CQE) to the appropriate completion queue (CQ) in memory 24, at a completion step 96. The client process will read the CQE and will then process the data in the normal manner.

On the other hand, when steering logic 64 determines at step 94 that the incoming packet is to be transmitted back out of the NIC, rather than delivered to a client process, the steering logic causes a send WQE to be written to a send queue 68 that has been reserved for this purpose, at a work item generation step 98. This send queue may be coupled in a QP 66 with the receive queue 70 from which the receive WQE was read at step 92, or it may be chosen by steering logic 64, based on the packet destination identifier, for example. The send WQE is generated by WQE generation logic 76 in receive pipe 62, as shown in FIG. 1.

After placing the send WQE in the appropriate send queue 68, WQE generation logic 76 generates a doorbell to send pipe 78, at a doorbell ringing step 100. The doorbell informs send pipe 78 that there is a new WQE in send queue 68. The send pipe 78 fetches and executes the send WQE, at an execution step 102. Execution of the send WQE causes send pipe 78 to read the packet payload from the buffer in which it is held and to send it to one of network ports 32, at a packet sending step 104. Network port selection logic 82 typically chooses the port based on the packet header fields and the QP number of the send queue 68 from which the send WQE was taken.

Figure 4:
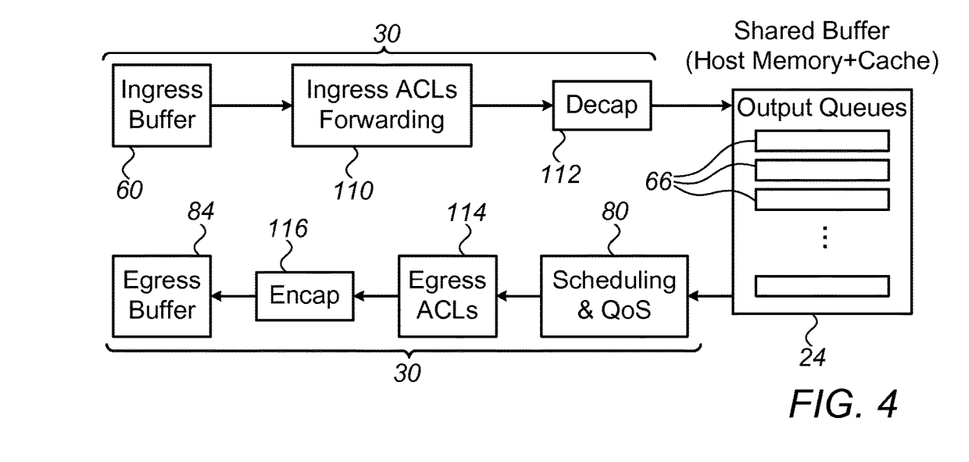
FIG. 4 is a flow chart that schematically illustrates a process of transferring data through a NIC, in accordance with an embodiment of the present invention.

FIG. 4 is a flow chart that schematically illustrates a process of transferring data through NIC 30, in accordance with an embodiment of the present invention. This figure shows the logical pipeline that is implemented by the elements of NIC 30, as described above, with the addition of a number of ancillary functions that may be incorporated into the logic of receive pipe 62 and send pipe 78. In the present example, the forwarding functions of receive pipe 62 include application of ingress access control lists (ACLs) 110, while send pipe 78 enforces egress access control lists 114.

As another example, receive pipe 62 can include decapsulation logic 112, for decapsulating tunneled packets received from the network (using protocols such as VXLAN or NVGRE, for instance), while encapsulation logic 116 in send pipe 78 encapsulates packets for transmission. These functionalities together with the switching functionality of NIC 30 can be used in some embodiments to fully offload certain virtual appliance functions from CPU 22. NIC 30 may thus operate as a load balancer, network address translation (NAT) gateway, or a router, including routing between different virtualized networks. These appliance functions can be applied to incoming packets by NIC 30 under the control of certain VMs with no software intervention at all in the actual packet processing. Computer 20 may run some regular VMs 42 that execute client applications and other VMs 42 that implement load balancers, routers, and/or other appliance functions in conjunction with NIC 30.

Network port selection logic 82 in NIC 30 may also implement link aggregation (LAG) between network ports 32. For this purpose, logic 82 may choose the port through which to send outgoing packets, for example, by computing a hash over certain packet fields (such as a 5-tuple) and using the hash result to choose an egress port.

The scheme described above and shown in FIGS. 1 and 4 provides four levels of buffering for packets that are looped through NIC 30 between network ports 32: ingress buffer 60, shared memory cache 74 in the NIC, shared host memory buffers 72, and egress buffers 84. These buffering capabilities enhance the flexibility of the NIC for pass-through packets. Host memory buffers 72 can be very large and hold a large amount of data if necessary (gigabytes and more), while cache 74 is smaller and helps to maintain low latency when switching function 48 is not heavily loaded. Cache 74 can also hold work queues 68, 70, as well as packets.

Based on the above capabilities, other ancillary functions performed by the receive and send pipes in NIC 30 may include one or more of the following:

Controlling QoS of data packets transmitted to the network (by scheduling and QoS logic 80). For fine-grained QoS control, NIC 30 may maintain a large number of send queues 68 and arbitrate between them on the basis of QoS definitions. The appropriate send queue can be chosen each packet processed in receive pipe 62 based on selected packet fields (such as the destination MAC address, VLAN, or TCP 5-tuple, for example). The choice of send queue can support, for example, throttling and packet pacing per TCP flow.

Congestion control. Switching function 48 in NIC 30 can track how much data is stored in the buffers (all four levels, as described above). If the buffers become too full, in terms of exceeding a threshold occupancy or any other suitable criterion for congestion detection, send pipe 78 in NIC 30 can raise a congestion control flag in the packets that it transmits, for example by marking the IP.ECN field in the packet headers. In this context, NIC 30 can implement schemes such as weighted random early detection (WRED) in order to mark and/or drop packets for the purpose of congestion avoidance.

Metering and counting of data packets.

Rewriting headers of the data packets (for purposes of NAT, for example, as mentioned above).

System Configurations

Figure 5:
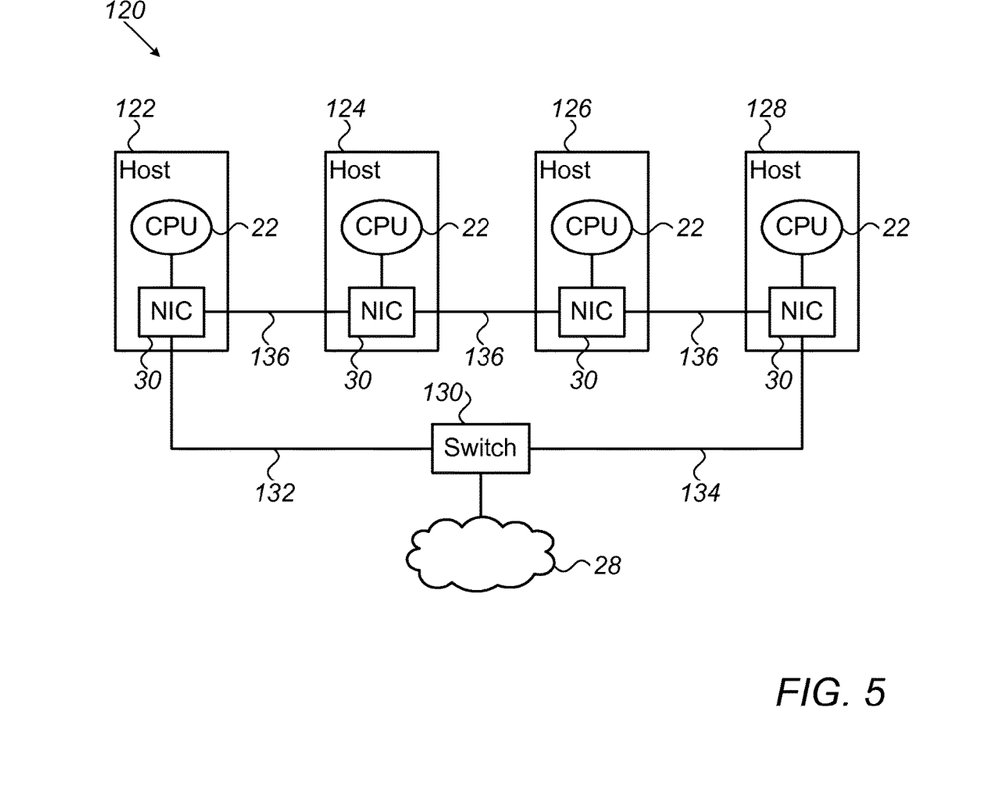
FIG. 5 is a block diagram that schematically illustrates a computer system, in accordance with an embodiment of the present invention.

FIG. 5 is a block diagram that schematically illustrates a computer system 120, in accordance with an embodiment of the present invention. In this embodiment, multiple host computers 122, 124, 126 and 128 are chained together using the packet forwarding capabilities of NICs 30, as described above. Only two ports 32 of the set of NICs 30 are connected to network 28. In the present example, these connections are made by network connections 132 and 134 between the NICs of computers 122 and 128 (the first and last computers in the chain) and a switch 130 at the edge of network 28. All of the remaining ports 32 are interconnected by physical links 136, which connect one port of each of the computers in the chain to a corresponding port of the next host computer in the chain. Although four computers are shown in FIG. 5 by way of example, the principles of this embodiment may be applied in chaining together two, three, of more computers with NICs as described herein.

Steering logic 64 in each NIC 30 checks the destination identifiers of incoming packets in FDB 73 in order to decide whether to deliver the packet to the local CPU 22 or forward it onward. In this manner, packets are passed from computer to computer through the chain until they reach their destinations.

When one or more computers in the chain move to standby mode, the switching functionality in their NICs should continue operating although system memory 24 is not available. In such cases, NIC 30 may use only its internal cache 74 to store packets and work queues. When a computer moves to standby mode, virtual appliances running on VMs 42 on the computer will not work. To handle this sort of situation, NIC 30 can store at least a part of forwarding database 73 in cache 74 and flood (send all packets coming in through one port 32 out to the other port) upon encountering a forwarding table miss. Alternatively, if the NIC does not maintain forwarding tables, it can simply flood all packets while the host computer is in standby mode.

The switching functions of NICs 30 are typically managed in software running on a suitable processor, for example on controller 86 in NIC 30 or on a dedicated CPU (not shown) attached to the NIC, or on CPU 22. NICs 30 may perform both or either of Layer 2 (link layer) and Layer 3 (network layer) switching in this fashion. As part of the Layer 2 switching function, the processor managing the switching function may be capable of running the spanning tree protocol (STP) in order to avoid looped connections (although the result in this case may be that only one of connections 132 and 134 is permitted to be active at any given time). Additionally or alternatively, a port-extender protocol, such as IEEE P802.1Qbh, may be used to expose all of the NICs in the chain to network 28 as a single, large NIC. In this case, all management functions are performed by switch 130, rather than in the NICs.

In one embodiment, computers 122, 124, 126 and 128 are mounted in a rack, with switch 130 at the top of the rack, as in many data center installations. In a conventional installation, eight long cables would be required in this configuration, with two cables connecting each NIC to a pair of ports on the switch. In system 20, however, only two network cables are required for network connections 132 and 134, while physical links 136 may be made by three substantially shorter interconnect cables. Thus, both the numbers and lengths of the cables can be reduced.

In an alternative embodiment, computers 122, 124, 126 and 128 may comprise blade servers, with connections 132, 134 and links 136 made through the backplane. The switch blades that are usually required in conventional installations may be eliminated (or at least reduced in number) thanks to the switching capabilities of NICs 30.

Figure 6:
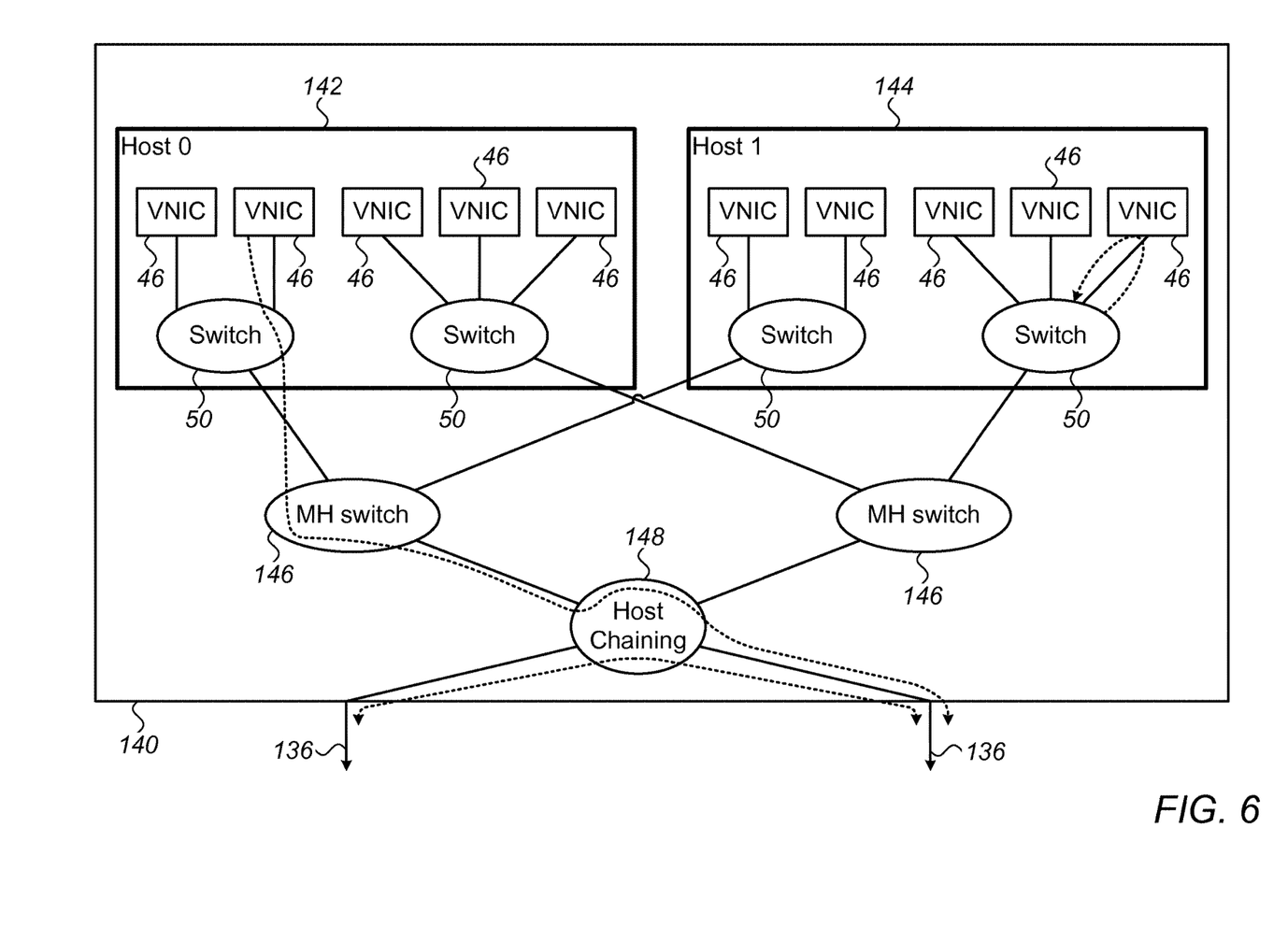
FIG. 6 is a block diagram that schematically illustrates a multi-host NIC, in accordance with another embodiment of the present invention.

FIG. 6 is a block diagram that schematically illustrates a multi-host NIC 140, in accordance with another embodiment of the present invention. This figure shows logical functions of a NIC that is configured to serve multiple host computers—in this case, two hosts, labeled Host 0 and Host 1 (although larger numbers of hosts may be served in similar fashion). NIC 140 comprises host-specific blocks 142 and 144, each exposing the functions of vNICs 46 and one or more virtual switches 50 to the respective host computer. Switches 50 perform some of the switch functions described above, such as forwarding packets to and from the respective VMs, as well as ancillary functions such as enforcing ACLs, packet counting, encapsulation/decapsulation, and QoS control.

In addition, NIC 140 implements multi-host switching functions 146 and host chaining functions 148 that serve both of the host computers. (Although FIG. 6 shows multiple switches 50 in each host-specific block and multiple multi-host switching functions 146, in alternative embodiments, there may be only a single switch 50 in each host-specific block and a single block for multi-host switching.) Multi-host switching function 146 queues and forwards packets to and from the hosts. Host chaining function 148 is responsible for packet forwarding, transmission and reception over the links to other NICs in the chain, as well as ancillary functions such as buffering, QoS control, learning, routing, congestion control, packet counting, and/or running STP.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A network interface device, comprising:
a host interface for connection to a host processor;
a network interface, which is configured to transmit and receive data packets over a network, and which comprises multiple distinct physical ports configured for connection to the network; and
processing circuitry, which is configured to read work items from send queues in a system memory of the host processor, via the host interface, and according to the read work items to gather data from the system memory and transmit it in outgoing packets through the network interface,
wherein the processing circuitry is further configured to receive, via one of the physical ports, a data packet from the network, to decide, responsively to a destination identifier in the received data packet, whether to deliver a payload of the received data packet to the host processor via the host interface or to forward the received data packet to the network via another one of the physical ports, to store a payload of the received data packet in a buffer, and upon deciding that the received data packet is to be forwarded to the network, to place a work item indicating a location of the stored payload, in one of the send queues in the system memory, without informing the host processor that the received data packet has arrived, such that in reading work items from the send queues, the processing circuitry will read the work item it placed in one of the send queues and will accordingly forward the received data packet to the network, such that the received data packet is forwarded back to the network without using switching hardware within the network interface device between a first one of the multiple distinct physical ports through which the received data packet was received from the network and a second one of the multiple distinct physical ports through which the received data packet is forwarded.

2. The device according to claim 1, wherein the host processor is configured to run multiple virtual machines, and
wherein the processing circuitry is configured to receive, via the host interface, a request from one of the virtual machines running on the host processor to transmit data in a further data packet, and responsively to the request, to decide whether to deliver the data to another one of the virtual machines running on the host processor or to forward the further data packet to the network via the network interface.

3. The device according to claim 2, wherein the processing circuitry is configured to forward the further data packet to the network from any of the virtual machines running on the host processor via any of the physical ports.

4. The device according to claim 1, wherein the host interface is configured for connection to multiple host processors, and
wherein the processing circuitry is configured to receive, via the host interface, a request from one of the host processors to transmit data in a further data packet, and responsively to the request, to decide whether to deliver the data to another one of the host processors or to forward the further data packet to the network via the network interface, and
wherein the processing circuitry is configured to forward the further data packet to the network from any of the host processors via any of the physical ports.

5. The device according to claim 1, wherein the processing circuitry comprises:
a receive pipe, coupled to receive the data packets from the network and to scatter the payload via the host interface to the system memory of the host processor;
a send pipe, coupled to transmit the data packets to the network; and
steering logic, which is configured, upon deciding that the received data packet is to be forwarded to the network, to queue the received data packet for transmission in the send pipe.

6. The device according to claim 5, wherein the steering logic is configured, upon deciding that the received data packet is to be forwarded to the network, to place a work item in a send queue without informing the host processor that the received data packet has arrived,
wherein the work item, when executed by the send pipe, causes the send pipe to fetch the received data packet and to select a physical port through which to transmit the received data packet to the network.

7. The device according to claim 1, wherein the processing circuitry is configured to decide whether to deliver the payload of the received data packet to the host processor or to forward the received data packet to the network by comparing the destination identifier of the received data packet to entries in a forwarding database.

8. The device according to claim 1, wherein the processing circuitry is configured to apply at least one ancillary function to the data packets, selected from a group of ancillary functions consisting of:
controlling a quality of service of the data packets transmitted to the network;
encapsulating and decapsulating packets that are transmitted via virtualized networks overlaid on the network;
congestion control;
metering and counting the data packets;
rewriting headers of the data packets; and
enforcement of access control lists.

9. The device according to claim 1, wherein storing the payload of the received data packet in a buffer comprises storing the payload of the received data packet via the host interface in the system memory.

10. A method for communication, comprising:
configuring a network interface controller (NIC), which is coupled to a host processor, to transmit and receive data packets over a data network via multiple distinct physical ports of the NIC that are configured for connection to the network and to read work items from send queues in a system memory of the host processor, via the host interface, and according to the read work items to gather data from the system memory and transmit it in outgoing packets through the network interface; and
upon receiving, via one of the physical ports, a data packet from the network, deciding in the NIC, responsively to a destination identifier in the data packet, whether to deliver a payload of the data packet to the host processor via the host interface or to forward the data packet to the network via another one of the physical ports, storing a payload of the data packet in a buffer, and upon deciding that the data packet is to be forwarded to the network, to place a work item indicating a location of the stored payload, in one of the send queues in the system memory, without informing the host processor that the data packet has arrived, such that the data packet is forwarded back to the network without using switching hardware within the NIC between a first one of the multiple distinct physical ports through which the data packet was received from the network and a second one of the multiple distinct physical ports through which the data packet is forwarded.

11. The method according to claim 10, and comprising receiving in the NIC a request from one of multiple virtual machines running on the host processor to transmit data in a further data packet, and responsively to the request, deciding in the NIC whether to deliver the data to another one of the virtual machines running on the host processor or to forward the further data packet to the network via the network interface.

12. The method according to claim 11, wherein the NIC is configured to forward the further data packet to the network from any of the virtual machines running on the host processor via any of the physical ports.

13. The method according to claim 10, wherein configuring the NIC comprises connecting the NIC to multiple host processors, and
wherein the method comprises receiving, in the NIC, a request from one of the host processors to transmit data in a further data packet, and responsively to the request, deciding in the NIC whether to deliver the data to another one of the host processors or to forward the further data packet to the network via one of the physical ports,
wherein the NIC is configured to forward the further data packet to the network from any of the host processors via any of the physical ports.

14. The method according to claim 10, wherein the NIC comprises a receive pipe, coupled to receive the data packets from the network and to scatter the payload to the system memory of the host processor, and a send pipe, coupled to transmit the data packets to the network, and
wherein deciding in the NIC comprises, upon deciding that the data packet is to be forwarded to the network, queuing the data packet for transmission in the send pipe.

15. The method according to claim 14, wherein queuing the data packet comprises placing, by the NIC, a work item in a send queue without informing the host processor that the data packet has arrived,
wherein the work item, when executed by the send pipe, causes the send pipe to fetch the data packet and to select a physical port through which to transmit the data packet to the network.

16. The method according to claim 10, wherein deciding in the NIC comprises comparing the destination identifier of the data packet to entries in a forwarding database in order to decide whether to deliver the payload of the data packet to the host processor or to forward the data packet to the network.

17. The method according to claim 10, and comprising applying in the NIC at least one ancillary function to the data packets, selected from a group of ancillary functions consisting of:
controlling a quality of service of the data packets transmitted to the network;
encapsulating and decapsulating packets that are transmitted via virtualized networks overlaid on the network;
congestion control;
metering and counting the data packets;
rewriting headers of the data packets; and
enforcement of access control lists.

* * * * *